3,307,909
CHEMICAL PROCESS FOR THE PRODUCTION
OF HYDROGEN PEROXIDE
Victor Joseph Reilly, Memphis, Tenn., assignor to E. I. du Pont de Nemours and Company, Wilmington, Del., a corporation of Delaware
No Drawing. Filed Oct. 4, 1962, Ser. No. 228,265
4 Claims. (Cl. 23—207)

This invention relates to the production of hydrogen peroxide and more particularly to an improved cyclic anthraquinone process for its production.

The cyclic anthraquinone process for producing hydrogen peroxide, as practiced commercially and as generally described in the literature, involves two main steps which are carried out successively. In the first step, an alkylanthraquinone dissolved in a water-immiscible organic solvent is hydrogenated in the presence of a particulate hydrogenation catalyst, following which the catalyst is separated to yield a solution of the corresponding alkylanthrahydroquinone in the solvent. The latter solution is then oxygenated in the second step by means of air or oxygen to regenerate the solution of the alkylanthraquinone which is recycled to the first step after first separating from the solution the hydrogen peroxide which is simultaneously formed. The hydrogen peroxide can be separated by distillation but is usually extracted with water.

In the above process, the alkylanthraquinone is generally referred to as the "working material," the water-immiscible solvent employed to dissolve it is referred to as the "working solvent," and the solution of the working material in the working solvent is referred to as the "working solution." The term "working material," as commonly employed, may also designate a tetrahydroalkylanthraquinone, a mixture of alkylanthraquinones or tetrahydroalkylanthraquinones, or a mixture of one or more alkylanthraquinones with one or more tetrahydroalkylanthraquinones, all of which effectively produce hydrogen peroxide when a working solution thereof in a working solvent is employed in the cyclic process.

As indicated, any of the alkylanthraquinones, the corresponding tetrahydroalkylanthraquinones and mixtures of two or more such compounds may be employed as working materials. Specific examples of compounds which may be used alone or in mixtures are the 2-ethyl-, 2-isopropyl-, 2-secondary-butyl-, 2-tertiary-butyl-, 1,3-dimethyl-, 2,3-dimethyl-, 1,4-dimethyl-, 2,7-dimethyl-, 2-iso-secondary-amyl- and 2-tertiary-amyl- anthraquinones, and the corresponding tetrahydroanthraquinones. The continued use of a starting alkylanthraquinone usually results in a slow conversion of a part thereof to the corresponding tetrahydroalkylanthraquinone so that the working material then will consist of a mixture of the two compounds.

The working solvent may be a single solvent or a mixed solvent containing a constituent for dissolving the quinone form of the working material and a constituent for dissolving the hydraquinone form of the working material. Such solvents are well known in the art. Some of the many solvents that have been used or proposed for use are described in U.S. Patents 2,215,883, 2,537,516, 2,537,655, 2,668,753, 2,768,065, 2,768,066 2,791,491, 2,890,105, 2,919,974, 2,927,002, 2,975,033, 2,990,251 and 3,002,817 and elsewhere.

Hydrogenation catalysts which have been used or proposed for use include Raney nickel and the noble metals, ruthenium, rubidium, platinum, rhodium and palladium. The noble metals are employed on carriers or supports, examples of which are activated alumina, magnesium oxide, titanium oxide, silica-alumina and the like.

The working material of the anthraquinone process is a costly chemical which must be used repeatedly and with little loss in order that the process be economically attractive. It is well known that long continued use of a working solution results in the degradation of a significant proportion of the working material to form products which are inert, i.e. do not produce hydrogen peroxide in the normal cyclic operation of the process. Such inert degradation products represent a substantial cost item since they must be removed from the working solution and replaced therein by expensive active working material in order that the $H_2O_2$-synthesizing capacity of the working solution be maintained at the desired high level.

The formation of such degradation products has long been recognized as a major problem associated with the anthraquinone process and various ways have been proposed for reducing or inhibiting their formation or for reconverting at least some of them to active working materials. Formation of the degradation products appears to arise mainly from the side reactions which take place in the hydrogenation step of the cyclic process. One proposal for reducing the formation of such degradation products involved controlling the degree of hydrogenation in the hydrogenation step to not more than 55% of theoretical (Canadian Patent 577,144). Another proposal was to reduce the contact time between the hydrogenation catalyst and the working solution (U.S. Patent 3,009,782). Still another proposal was to employ a fixed bed hydrogenation catalyst which is a noble metal on a support material of low surface area and low pore volume U.S. Patent 3,030,186). It has also been proposed to inhibit formation of such degradation products during hydrogenation by having dissolved in the working solution fed to the hydrogenator alkali compounds such as various amines (British Patent 795,272).

While some or all of the foregoing proposals are effective to some extent, they are not entirely satisfactory in that they are not as effective as desired or they require relatively extensive or expensive modification of the basic cyclic process.

It is an object of the invention to provide a simple yet effective way of reducing substantially the rate of loss of working material in the operation of an anthraquinone process for producing hydrogen peroxide. A further object is to provide an improved anthraquinone process for producing hydrogen peroxide wherein the consumption of working material through its conversion to inert degradation products is reduced substantially and the amount of such degradation products that must be removed from and replaced in the working solution is correspondingly reduced. Still further objects will be apparent from the following description.

The objects of the invention are accomplished by carrying out the hydrogenation in the hydrogenation step of the usual cyclic anthraquinone process for producing hydrogen peroxide in the presence of a catalyst-free, solid particulate inorganic alkaline material which is insoluble in the working solvent of the cyclic process and is in admixture with the solid particulate hydrogenation catalyst employed in the hydrogenation step. It now has been found that the presence of such alkaline material in admixture with the hydrogenation catalyst results in a substantial decrease in the amount of inert degradation products formed, and, therefore, also a decrease in the amount of such degradation products that must be removed from and replaced in the working solution.

Alkaline materials which are effective for use in accordance with the invention are the carbonates of the alkaline earth metals, magnesium and the alkali metals; the bicarbonates of the alkali metals; the hydroxides and oxides of magnesium and those of the alkaline earth metals which are essentially insoluble in the working solution. Specific examples of suitable alkaline materials are sodium carbonate and bicarbonate, calcium and magnesium carbonates and magnesium hydroxide. Others that can be used are strontium and barium carbonates and magnesium oxide. The mineral carbonates such as calcite (calcium carbonate) and particularly marble are preferred for use in the method of the invention because of their high effectiveness, their ready availability and the physical strength of their particles; furthermore, spent catalyst in admixture therewith can be regenerated by air roasting without destroying the effectiveness of either. Another preferred alkaline material is sodium carbonate monohydrate because of its high effectiveness. When this material is used, it can be readily separated from catalyst which has become spent by leaching with water before subjecting the catalyst to regeneration treatment.

Acidic impurities are normally formed in small but significant amounts in the working solution during operation of the cyclic process. Such impurities appear to promote the undesired side reactions which produce the inert degradation products. The mechanism by which the above alkaline materials function to reduce or inhibit formation of degradation products is not entirely understood, but it is thought that they serve primarily to neutralize the acidic impurities as they are formed, thereby inhibiting their promotion of the undesired side reactions. Whether or not this be the proper explanation, the present invention is based upon the discovery that use of the above alkaline materials as described results in a substantial and important reduction in the amount of inert degradation products formed during operation of the cyclic process.

The amount of the particulate, insoluble, catalyst-free alkaline material which should be present in the working solution during hydrogenation in accordance with the invention is not critical, so long as sufficient is present to neutralize any acidity which may tend to develop. Amounts as small as 0.3%, based upon the weight of the working solution, are effective, but from 1 to 5% will most generally be used and are preferred. Much larger amounts can be used if desired.

The alkaline material employed in accordance with the invention preferably will be of a particle size similar to that of the particulate hydrogenation catalyst with which it is admixed. Thus, where the hydrogenation catalyst is employed as particles suspended or fluidized in the working solution by agitation of the slurry, the alkaline material preferably will also be of a particle size that will be readily suspended along with the catalyst in the working solution. When the catalyst is employed in the form of a fixed-bed of granules through which the working solution and hydrogen are passed, the particles of alkaline material admixed in the bed with the catalyst are preferably of about the same size as the catalyst particles. In fixed-bed operation, particle sizes of the catalyst and of the alkaline material generally will range from about 4 to 100 mesh; whereas in fluidized or slurry operations, the corresponding particle sizes will generally range from 60 to 400 mesh (U.S. Standard Screen Scale).

It has been proposed heretofore to employ hydrogenation catalysts consisting of a noble metal on an alkaline earth metal carbonate (Canadian Patent 600,851), or a magnesium oxide or hydroxide (U.S. Patent 2,930,803) support or carrier. However, such carbonate, oxide or hydroxide catalyst supports have low resistance to attack by the working solution, since the acidic substances which normally develop in the working solution tend to dissolve the catalyst support during use; and precipitated supports such as magnesium hydroxide break up readily when fluidized in the working solution. Furthermore, effective palladium-on-calcium carbonate catalysts are difficult to prepare; when conventional impregnation procedures are employed, most of the palladium is precipitated out as unsupported palladium black (undesirable) while the resulting support with its meager palladium deposit is of relatively low catalytic activity.

The invention is illustrated by the following examples in which all percentages are by weight.

Example 1

A working solution containing 9.3% 2-tertiary-butyl-anthraquinone and 7.0% tetrahydro-2-tertiary-butylanthraquinone in a working solvent consisting of a mixture of methylnaphthalenes and diisobutylcarbinol was employed in a cyclic operation in which it was subjected repeatedly to successive hydrogenation and oxygenation treatments. Hydrogenation was effected in each cycle at about 45° C. with hydrogen at a pressure of about 1 atmosphere in the presence of about 7%, based upon the weight of the working solution, of a suspended catalyst consisting of 0.6% metallic palladium on activated alumina of a particle size ranging from about 60 to 400 mesh. From about 50–55% of the active anthraquinone compounds present was hydrogenated. The hydrogenated working solution thus formed in each cycle was filtered to remove the catalyst, then oxygenated by contacting it with oxygen at about 45° C. and 1 atmosphere pressure. After removing the hydrogen peroxide formed from the oxidized working solution by countercurrent extraction with water, the oxidized working solution was recycled to the hydrogenator.

After 250 hydrogenation-oxygenation cycles, the amount of working material which had become degraded to inert materials, i.e., materials having no $H_2O_2$-synthesizing value in the process, amounted to 0.17 g. per gram mole of $H_2O_2$ produced. A total of 315 gram moles of $H_2O_2$ was produced.

Example 2

The procedure of Example 1 was repeated except that the working solution in the hydrogenator contained 3%, based upon the weight of the working solution, of catalyst-free ground marble (mineral calcium carbonate) in admixture with the palladium-on-activated alumina catalyst. The particle size of the marble was about the same as that of the catalyst. After 250 hydrogenation-oxygenation cycles, the amount of working material which had become degraded to inert materials amounted to only 0.034 g. per gram mole of $H_2O_2$ produced. A total of 330 gram moles of $H_2O_2$ was produced.

Example 3

The procedure of Example 1 was repeated except that the working solution in the hydrogenator contained about 2%, based upon the weight of the working solution, of catalyst-free magnesium hydroxide particles in admixture with the catalyst particles. After 220 hydrogenation-oxygenation cycles, the amount of working material which had become degraded to inert materials amounted to 0.09 g. per gram mole of $H_2O_2$ produced. A total of 240 gram moles of $H_2O_2$ was produced.

Example 4

The procedure of Example 1 was repeated except that the working solution in the hydrogenator contained about 3%, based upon the weight of the working solution, of catalyst-free sodium carbonate monohydrate particles in admixture with the particles of the hydrogenation catalyst. After 115 hydrogenation-oxygenation cycles, the amount of working material which had become degraded to inert material amounted to less than 0.03 g. per gram mole of $H_2O_2$ produced. A total of 160 gram moles of $H_2O_2$ was produced.

The values reported in the examples for the amounts of working materials (total anthraquinones) that had become degraded during the test periods of cyclic operation were calculated from anthraquinone mass balances for the system at the beginning and end of the period, based upon polarographic analyses for anthraquinones.

It will be seen that the presence of an insoluble, catalyst-free alkaline material in admixture with the catalyst particles in the hydrogenator in Examples 2 thru 4 resulted in the formation of much less degradation products than were formed in Example 1 wherein hydrogenation was effected in the absence of such alkaline material but otherwise under essentially the same conditions. Furthermore, the reduction in the formation of degradation products in Examples 2–4 was accomplished without any significant reduction in the cavity of the catalyst, and without any significant separation of the palladium metal from the alumina catalyst support resulting. The examples thus demonstrate the practical effectiveness of such alkaline materials when used in accordance with the invention in reducing the formation of inert degradation products. Obviously, any reduction in the amount of such degradation products formed represents a corresponding reduction in the amount of degradation products that must be removed from the working solution and a corresponding reduction in the amount of active working material that must be added to the work solution in order to maintain its $H_2O_2$-synthesizing capacity at a desired high level.

The method of the invention can be practiced successfully employing working solutions containing any of the working materials heretofore proposed dissolved in any of the working solvents previously proposed for the anthraquinone process, as previously indicated. Also, any of the hydrogenation catalysts heretofore proposed may be used, so long as they are employed in admixture with a solid, catalyst-free, insoluble particulate alkaline material as set forth above. Temperature and pressure conditions in the hydrogenation and oxygenation steps of the cyclic process will be essentially those heretofore employed in the practice of such process. Thus, the hydrogenation will usually be affected at temperatures ranging from 20 to 50° C. at hydrogen pressures of 0.4 to 20 atmospheres, while the oxygenation will generally be carried out with oxygen or air at temperatures of 20 to 60° C. at atmospheric or somewhat elevated pressures. However, temperatures and pressures outside the above ranges can be used.

The embodiments of the invention in which an exclusive property or privilege is claimed are defined as follows:

I claim:
1. In a cyclic anthraquinone process for producing hydrogen peroxide involving the successive steps of: (1) hydrogenating in the presence of a solid particulate hydrogenation catalyst an alkylanthraquinone in solution in a water-immiscible solvent, and (2) oxygenating the resulting alkylanthrahydroquinone dissolved in said solvent to regenerate the solution of said alkylanthraquinone for recycling in the process after first separating therefrom the hydrogen peroxide which is simultaneously formed, the improvement comprising effecting said hydrogenation in step (1) at a temperature not exceeding about 50° C. and in the presence of a solid, catalyst-free, particulate inorganic alkaline material which is insoluble in said solvent and is in admixture with said hydrogenation catalyst, said alkaline material being present in said solution in an amount sufficient to effectively neutralize any acidity which may develop in said solution, and said alkaline material being a member of the group consisting of the carbonates, the hydroxides and the oxides of magnesium and the alkaline earth metals.

2. The method of claim 1 wherein said alkaline material is magnesium hydroxide.

3. The method of claim 1 wherein said alkaline material is calcium carbonate.

4. The method of claim 1 wherein said alkaline material is marble.

References Cited by the Examiner

UNITED STATES PATENTS

| 2,739,875 | 3/1956 | Sprauer et al. | 23—207 |
| 3,009,782 | 11/1961 | Porter | 23—207 |
| 3,098,714 | 7/1963 | Kabisch et al. | 23—207 |
| 3,150,930 | 9/1964 | Hiratsuka et al. | 23—207 |

FOREIGN PATENTS

| 776,991 | 6/1957 | Great Britain. |

References Cited by the Applicant

FOREIGN PATENTS

| 600,851 | 6/1960 | Canada. |
| 795,272 | 5/1958 | Great Britain. |
| 838,939 | 6/1960 | Great Britain. |

OSCAR R. VERTIZ, *Primary Examiner.*

O. F. CRUTCHFIELD, *Assistant Examiner.*